(12) United States Patent
Hwang et al.

(10) Patent No.: US 10,412,452 B2
(45) Date of Patent: Sep. 10, 2019

(54) DISPLAY DEVICE AND METHOD FOR REPLACING ADVERTISEMENT

(71) Applicant: SAMSUNG ELECTRONICS CO., LTD., Suwon-si, Gyeonggi-do (KR)

(72) Inventors: Eui Hyeon Hwang, Seongnam-si (KR); Do Wan Kim, Gunpo-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 8 days.

(21) Appl. No.: 15/885,102

(22) Filed: Jan. 31, 2018

(65) Prior Publication Data

US 2018/0234728 A1 Aug. 16, 2018

(30) Foreign Application Priority Data

Feb. 10, 2017 (KR) .................. 10-2017-0018691

(51) Int. Cl.
| | | |
|---|---|---|
| *H04N 21/458* | (2011.01) | |
| *H04N 21/44* | (2011.01) | |
| *H04H 20/10* | (2008.01) | |
| *H04H 60/65* | (2008.01) | |
| *H04N 21/81* | (2011.01) | |
| *H04N 21/431* | (2011.01) | |
| *H04N 21/462* | (2011.01) | |
| *H04N 21/485* | (2011.01) | |

(52) U.S. Cl.
CPC ...... *H04N 21/4586* (2013.01); *H04H 20/106* (2013.01); *H04H 60/65* (2013.01); *H04N 21/4316* (2013.01); *H04N 21/44008* (2013.01); *H04N 21/44016* (2013.01); *H04N 21/4622* (2013.01); *H04N 21/4852* (2013.01); *H04N 21/812* (2013.01)

(58) Field of Classification Search
CPC .................. H04N 21/4622; H04N 21/44008
See application file for complete search history.

(56) References Cited

U.S. PATENT DOCUMENTS 7,038,738 B2    5/2006   Kwon
7,859,599 B2 * 12/2010   Ogusu .................. H03G 3/301
                                                                                               348/564

(Continued)

OTHER PUBLICATIONS

Extended European Search Report dated Jul. 5, 2018 in corresponding European Patent Application No. 18153529.5.

*Primary Examiner* — Fernando Alcon
*Assistant Examiner* — Frank Johnson
(74) *Attorney, Agent, or Firm* — Staas & Halsey LLP

(57) ABSTRACT

A display device and a method for replacing an advertisement are provided. The display device includes a display, a first communication circuit which receives first content from a broadcast receiving device, a second communication circuit which receives second content from an external server, and a processor electrically connected with the first communication circuit and the second communication circuit. The processor is configured to determine whether a first volume image applied by the broadcast receiving device is present in the first content, while outputting the second content, and overlay the first volume image or an alternative volume image corresponding to the first volume image with the second content to display an overlaid result on the display, if the first volume image is contained in the first content.

19 Claims, 10 Drawing Sheets

(56) References Cited

U.S. PATENT DOCUMENTS

| | | | |
|---|---|---|---|
| 8,966,512 B2 | 2/2015 | Sivertsen | |
| 9,154,841 B2* | 10/2015 | Sinha | H04H 60/40 |
| 9,451,230 B1* | 9/2016 | Henderson | H04N 9/802 |
| 9,647,621 B2 | 5/2017 | Roberts | |
| 9,893,695 B2 | 2/2018 | Roberts | |
| 2002/0024617 A1 | 2/2002 | Kwon | |
| 2005/0264705 A1* | 12/2005 | Kitamura | H04N 5/60 |
| | | | 348/738 |
| 2006/0195859 A1 | 8/2006 | Konig et al. | |
| 2011/0181789 A1* | 7/2011 | Nishimura | H03G 3/3026 |
| | | | 348/731 |
| 2013/0024888 A1 | 1/2013 | Sivertsen | |
| 2013/0033644 A1* | 2/2013 | Kim | H04N 21/42203 |
| | | | 348/563 |
| 2014/0369526 A1 | 12/2014 | Roberts | |
| 2016/0127801 A1* | 5/2016 | Baldwin | H04N 21/812 |
| | | | 725/34 |
| 2016/0234564 A1* | 8/2016 | Holyoak | H04N 21/812 |
| 2017/0237405 A1 | 8/2017 | Roberts | |
| 2018/0167045 A1 | 6/2018 | Roberts | |

* cited by examiner

DISPLAY DEVICE AND METHOD FOR REPLACING ADVERTISEMENT

CROSS-REFERENCE TO RELATED APPLICATION(S)

This application claims the benefit under 35 U.S.C. § 119(a) of a Korean patent application filed on Feb. 10, 2017 in the Korean Intellectual Property Office and assigned Serial number 10-2017-0018691, the entire disclosure of which is hereby incorporated by reference.

TECHNICAL FIELD

The present disclosure relates to a display device capable of replacing an advertisement and a method for replacing an advertisement.

BACKGROUND

Dynamic advertisement replacement (DAR) is not to output first advertisement content received from a first server (e.g., a broadcast server), but to output second advertisement content received from a second server (e.g., an advertisement server).

The DAR may be performed by a set top box, which receives content, or a display device (e.g., a television (TV)) which reproduces content. For example, a conventional set top box or a conventional display device may communicate with an auto contents recognition (ACR) server to determine a time point for replacing the first advertisement content, may receive the second advertisement content, which the first advertisement content is to be replaced with at the determined time point, from the advertisement server, and may output the second advertisement content instead of the first advertisement content at the determined time point.

SUMMARY

The display device may receive broadcast content through a broadcast receiving device (e.g., a set top box) and may directly perform the DAR. For example, the display device may receive broadcast content (e.g., advertisement content, or broadcast program content) from the broadcast receiving device and may receive alternative advertisement content, with which the broadcast content is to be replaced, from an external server (e.g., an advertisement server). The display device may output the alternative advertisement content instead of existing advertisement content.

Aspects of the present disclosure are to address at least the above-mentioned problems and/or disadvantages and to provide at least the advantages described below. Accordingly, an aspect of the present disclosure is to provide a display device capable of performing processing corresponding to an UI image of a broadcast receiving device when outputting second content which is received from an external server instead of the first content which is received from the broadcast receiving device.

In accordance with an aspect of the present disclosure, a display device may include a display, a first communication circuit which receives first content from a broadcast receiving device, a second communication circuit which receives second content from an external server, and a processor electrically connected with the first communication circuit and the second communication circuit. The processor may be configured to determine whether a first volume image applied by the broadcast receiving device is present in the received first content, while outputting the received second content, and overlay the first volume image or an alternative volume image corresponding to the first volume image with the received second content, and to display an overlaid result on the display, when the processor determines that the first volume image is contained in the received first content.

In accordance with an aspect of the present disclosure, a method for replacing an advertisement by a display device may include receiving first content from a broadcast receiving device, receiving second content from an external server, outputting the received second content instead of the received first content, determining whether a first volume image is contained in the received first content, while outputting the received second content, and overlaying the first volume image or an alternative volume image corresponding to the first volume image with the received second content, and to display an overlaid result of the overlaying, when the first volume image is determined to be contained in the received first content.

In accordance with an aspect of the present disclosure, a computer-readable recording medium may have a program recorded thereon which performs a method including outputting second content from an external server instead of received first content from a broadcast receiving device, determining whether a first volume image is contained in the received first content, while outputting the received second content, and overlaying a first volume image or an alternative image corresponding to the first volume image with the received second content to display an overlaid result from the overlaying, when the first volume image is determined to be contained in the received first content.

According to embodiments disclosed in the present disclosure, the alternative advertisement may be processed corresponding to the user interface (UI) of the broadcast receiving device, when the alternative advertisement is output.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or "at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Figure 1:
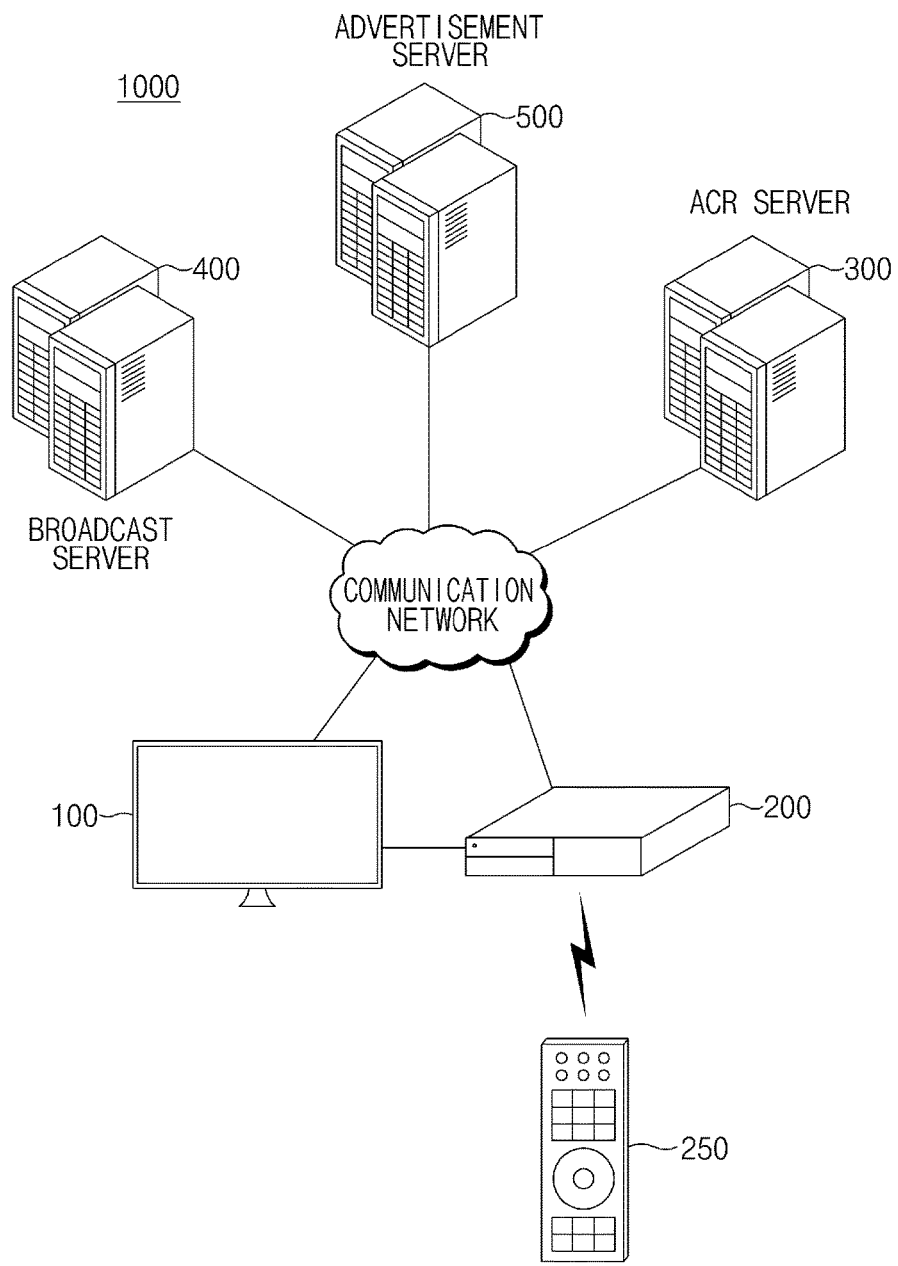
FIG. 1 is a view illustrating the configuration of a digital broadcast system, according to an embodiment.

FIG. 1 is a view illustrating the configuration of a digital broadcast system, according to an embodiment.

Referring to FIG. 1, according to an embodiment, a digital broadcast system 1000 may include a display device 100, a broadcast receiving device 200, an ACR server 300, a broadcast server 400, and an advertisement server 500. Although FIG. 1 illustrates one display device 100 for convenience of explanation, the display device 100 may serve as a device receiving a digital broadcast according to an embodiment and may be at least one device used by a plurality of users.

According to an embodiment, the broadcast receiving device 200 may receive broadcast content from the broadcast server 400. The broadcast content may include, for example, a content (e.g., a broadcast program) image or an advertisement image. The broadcast receiving device 200 may be connected with the broadcast server 400 and the display device 100 through at least one communication network.

According to an embodiment, the broadcast receiving device 200 may transmit broadcast content, which is received from the broadcast server 400, to the display device 100. The broadcast receiving device 200 may blend the received broadcast content with a user interface (UI) image and may transmit the blending result to the display device 100. For example, if a user input is received, the broadcast receiving device 200 may blend the broadcast content with a UI image corresponding to the received user input and may transmit the blending result to the display device 100. The UI image may be an image for the display of the function executed depending on the user input or may be an image for the display of the information requested by the user input. For example, the UI image is to express a content information image, a channel information image, and a volume image. The UI image may include a text image. For example, the broadcast receiving device 200 may be one of various devices, such as a set top box, to receive or store content and to transmit the content to the display device 100. The volume image may include, for example, a volume level image representing volume level information and a mute image representing that music is in a mute state.

A remote controller 250 of the broadcast receiving device 200 may include two types of volume control buttons. Among them, one type of volume control buttons may be first volume control buttons for controlling the volume of the display device 100, and another type of volume control buttons may be second volume control buttons for controlling the volume of the broadcast receiving device 200. If the first volume control buttons are manipulated, the remote controller 250 may transmit a first user input for a request for the volume control to the display device 100. If the second volume control buttons are manipulated, the remote controller 250 may transmit a second user input for the request for the volume control to the broadcast receiving device 200. According to an embodiment, if receiving the first user input from the remote controller 250 of the broadcast receiving device 200, the display device 100 controls the volume of broadcast content by using an amplifier provided in the display device 100 and may overlay the volume image of the display device 100 with the broadcast content to display the overlaid result. According to an embodiment, if receiving the second user input, the broadcast receiving device 200 controls the volume of broadcast content by using an amplifier provided in the broadcast receiving device 200 and may blend a volume image of the broadcast receiving device 200 with the broadcast content to transmit the blended result to the display device 100. As described above, since the broadcast receiving device 200 and the display device 100 may have mutually different volume control elements, the unit for volume control corresponding to the first user input may be different from the unit of volume control corresponding to the second user input.

The display device 100 may include, for example, at least one of a television (TV), a monitor, a notebook computer, a large format display (LFD), a tablet personal computer (PC), an e-book reader, a desktop personal computer, a laptop personal computer, a netbook computer, or an electronic picture frame. For example, the display device 100 may include at least one of a smartphone or a mobile phone. The display device 100 may communicate with the broadcast server 400, the ACR server 300, or the advertisement server 500 through the communication network. The communication network may include the Internet or a broadcast network. The communication network may include, for example, a local area network (LAN), a fiber to the home (FTTH) network, a digital subscriber line (xDSL) network, a wireless fidelity (Wi-Fi) network, a wireless broadband Internet (Wibro), a $3^{rd}$ generation (3G) network, or a $4^{th}$ generation (4G) network.

The display device 100 may receive broadcast content from the broadcast receiving device 200. For example, the display device 100 may receive the broadcast content by being connected with the broadcast receiving device 200 through a wired interface (e.g., high definition multimedia interface (HDMI), a digital video/visual interactive (DVI), a video graphics array (VGA), a display port, or the like) or a wireless interface (e.g., a wireless HD (WiHD), a wireless gigabit (Wigig), or the like). The broadcast content may include, for example, at least one of a content (e.g., broadcast program) image, an advertisement image, or a UI image.

According to various embodiments, the display device 100 may create image identification information (e.g., a fingerprint or a watermark of a content image for the broadcast content) for the broadcast content and may transmit the image identification information to the ACR server 300. The ACR server 300 may transmit information (alternative advertisement information) on an alternative advertisement corresponding to the image identification information. If receiving the alternative advertisement information from the ACR server 300, the display device 100 may transmit a request for the alternative advertisement to the advertisement server 500. The request for the alternative advertisement may include information necessary for the selecting of the alternative advertisement by the advertisement server 500. For example, the request for the alternative advertisement may include the alternative advertisement information (e.g., reproduction channel information, the starting time of an advertisement or the identification information of the advertisement) and user profile information (e.g., a place of residence, a gender, an age, interests, or the like).

According to an embodiment, the display device 100 may receive the alternative advertisement corresponding to the request for the alternative advertisement from the advertisement server 500. The display device 100 may output the alternative advertisement instead of the broadcast content at the starting time of the advertisement based on the alternative advertisement information.

According to an embodiment, the display device 100 may stop outputting the alternative advertisement if another UI image is included in addition to the volume image when the alternative advertisement is output instead of the broadcast content. In the following description, for the convenience of explanation, the broadcast content (e.g., advertisement content or a broadcast program content), which is not output on the display device 100 due to the alternative advertisement, is called "first content" and content (e.g., the alternative advertisement), which is output on the display device 100 instead of the first content, called "second content".

According to an embodiment, the display device 100 may determine whether a volume image is contained in the first content, when the second content (e.g., an alternative advertisement) is output. If the volume image is contained in the first content, the display device 100 may overlay the volume image of the display device 100 or the broadcast receiving device 200 with an image of the second content.

According to an embodiment, the display device 100 may determine whether to change a volume based on the volume image and, if the volume level is changed, may control a volume level of the display device 100 depending on the changed volume level. According to an embodiment, the display device 100 may store information on a volume level of the display device 100 before controlling the volume level of the display device 100. If the outputting of the second content is completed or stopped, the display device 100 may recover the volume level of the display device 100 to the volume level stored before controlling the volume level of the display device 100. As described above, according to an embodiment, when the second content is output instead of the first content, an output volume level is controlled by recognizing the volume control by the broadcast receiving device 200 from the first content to control an output volume level.

According to an embodiment, the display device 100 may stop the outputting of the second content and output the first content if another UI image is contained in the first content instead of the volume image. The display device 100 may determine whether another UI image is contained in the first content by comparing the first content (or the feature information of the first content) with the source (or the feature information of the source of the first content) of the first content received from the ACR server 300 or another server (not illustrated). The source of the first content may include first content having no the UI image (e.g., another UI image).

According to an embodiment, the ACR server 300 may identify a channel corresponding to the image identification information if receiving the image identification information. For example, the ACR server 300 may include a database to store the image identification information corresponding to each broadcast channel. The ACR server 300 may identify the channel corresponding to the image identification information by comparing the received image identification information with image identification information for each broadcast channel stored in the database.

The ACR server 300 may examine a broadcast schedule (e.g., a broadcast program schedule, or an advertisement schedule) of the identified channel. The ACR server 300 may determine whether an alternative advertisement is present for the identified channel, by using broadcast schedules of a plurality of channels stored in the database. The ACR server 300 may recognize the alternative advertisement information and may transmit the alternative advertisement information (e.g., the starting time of an advertisement or the identification information of the advertisement) to the display device 100, if the alternative advertisement is present for the identified channel. According to an embodiment, at least a portion of operations performed by the ACR server 300 may be performed by the display device 100.

According to an embodiment, the ACR server 300 or another server (not illustrated) may transmit at least one of the first content or the feature information of the first content for determining whether the UI image is contained in the first content. The ACR server 300 or another server (not illustrated) may transmit at least one of the first content or the feature information of the first content for determining whether the volume image is contained in the first content.

According to an embodiment, the broadcast server 400 may transmit the broadcast content to the broadcast receiving device 200 in real time. The broadcast server 400 may transmit the broadcast content, which is requested by the broadcast receiving device 200, to the broadcast receiving device 200.

According to an embodiment, the advertisement server 500 may provide the alternative advertisement to the display device 100 according to the request of the display device 100. For example, the advertisement server 500 may receive an alternative advertisement request, which includes at least one of alternative advertisement information or user profile information (e.g., the place of residence, a gender, an age, interests, or the like), from the display device 100. The advertisement server 500 may select an alternative advertisement based on at least one of the alternative advertisement information or the user profile information included in the alternative advertisement request and may transmit the selected alternative advertisement to the display device 100.

Hereinafter, a volume image according to an embodiment will be described with reference to FIGS. 2 to 5.

Figure 2:
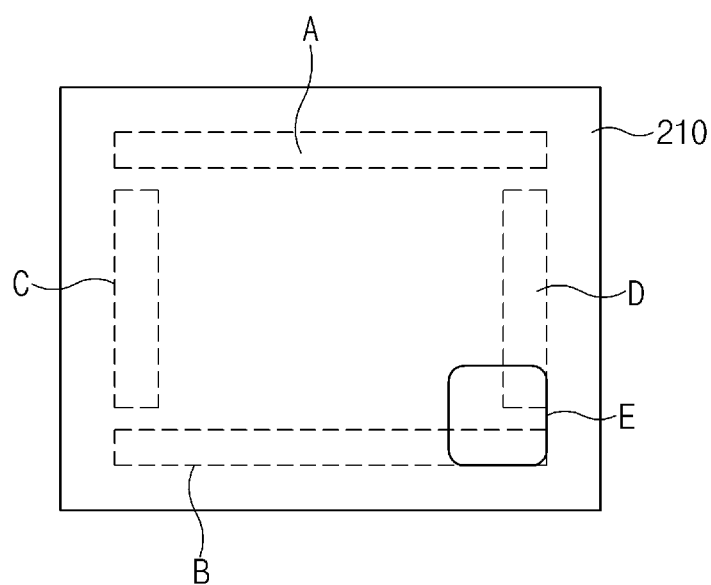
FIG. 2 is a view illustrating a display area of a volume image, according to an embodiment.

FIG. 2 is a view illustrating a display area of the volume image, according to an embodiment.

Referring to FIG. 2, the volume image may be placed at edge areas (see A to E areas) of a broadcast content image 210 to prevent the volume image from interrupting the viewing of the broadcast content by a user. For example, the volume image may be placed at an upper area A or a lower area B of the broadcast content image 210. For another example, the volume image may be placed at a left area C or a right area D of the broadcast content image 210. For another example, the volume image may be placed in at least one (e.g., reference numeral E) of four corners of the broadcast content image 210. The volume image may be created by the broadcast receiving device 200 or may be created by the display device 100. However, since the volume image is an output image corresponding to a user input, the volume image may be created by a device which has received the user input.

Figure 3:
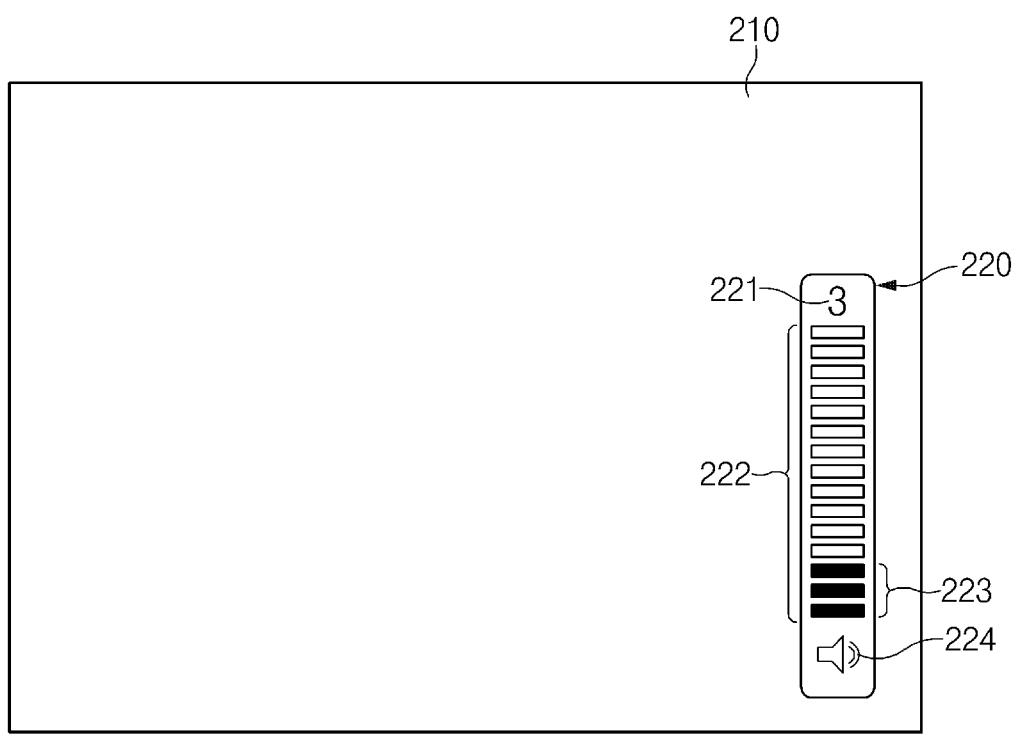
FIG. 3 is a view illustrating a volume image of a broadcast receiving device, according to an embodiment of the present invention.
Figure 4:
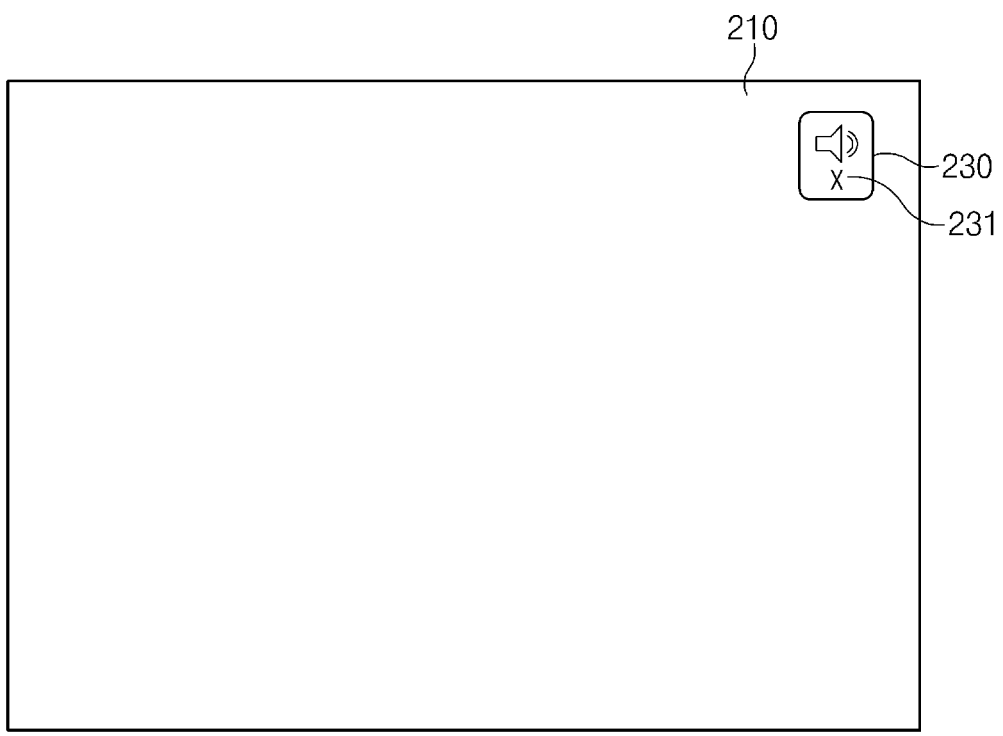
FIG. 4 is a view illustrating a mute image of the broadcast receiving device 200, according to an embodiment of the present invention.

FIG. 3 is a view illustrating the volume image of the broadcast receiving device, according to an embodiment of the present invention, and FIG. 4 is a view illustrating a mute image of the broadcast receiving device, according to an embodiment of the present invention.

Referring to FIGS. 3 and 4, the volume image overlaid with the broadcast content image 210 may include a volume level image (see FIG. 3) representing a volume level and a mute image (see FIG. 4) representing that the outputting of the audio is stopped. In the following description, the volume level image and the mute image are collectively referred to as "volume image" for the convenience of explanation.

As illustrated in FIG. 3, a volume image 220 may include at least one of a number 221 representing a volume level, a first image 222 representing the total controllable volume levels, a second image 223 representing a present volume level, or a background image 224. The first image 222 may be an image of rectangular symbols formed in number corresponding to the number of the total controllable volume levels. The second image 223 may be an image of full black-colored rectangular symbols formed in number corresponding to the present volume level.

As illustrated in FIG. 4, a mute image 230 may be displayed on an area different from an area of the volume image 220 in the broadcast content image 210. The mute image 230 may include an image or a text 231 representing that the audio is not output.

Figure 5:
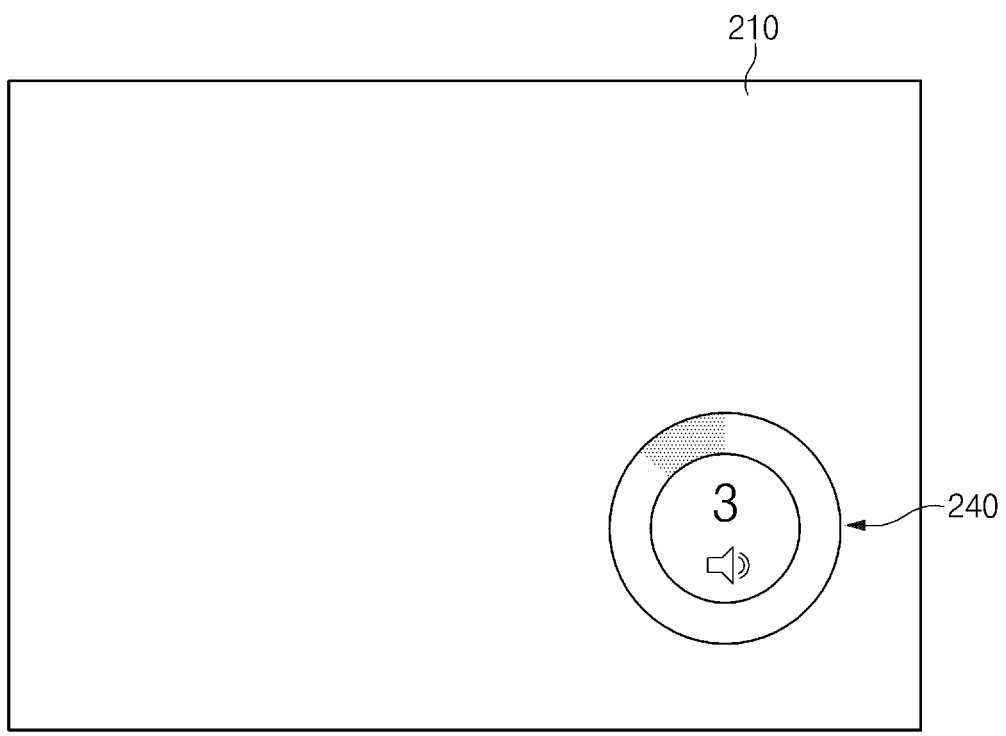
FIG. 5 is a view illustrating the volume image of a display device, according to an embodiment of the present invention.

FIG. 5 is a view illustrating the volume image of the display device, according to an embodiment of the present invention.

As illustrated in FIG. 5, the display device 100 may create and output a volume image 240 different from a volume image of the broadcast receiving device 200. The volume image 240 of the display device 100 may include at least one of a number, an image, or a background image representing the volume level.

Figure 6:
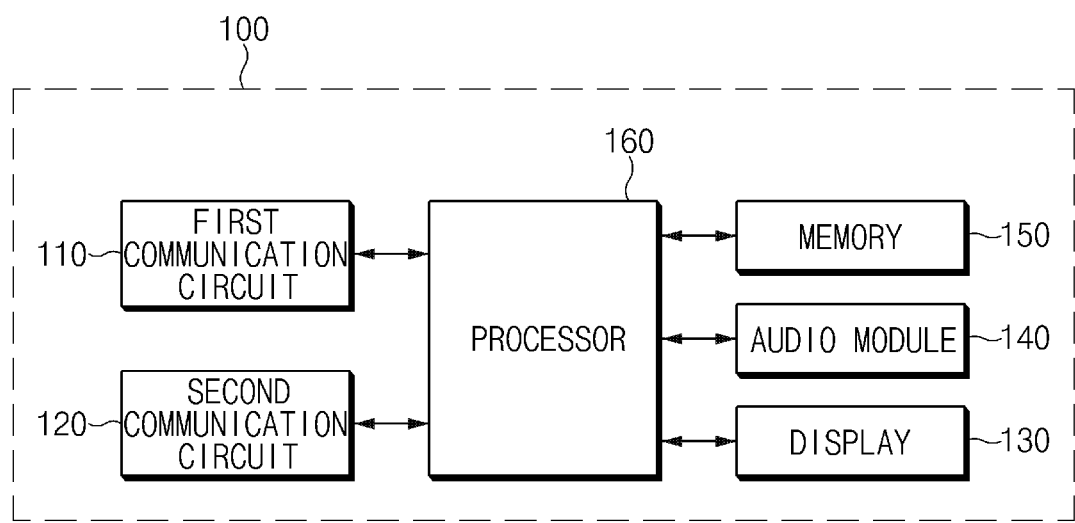
FIG. 6 is a block diagram illustrating the display device, according to various embodiments.

FIG. 6 is a block diagram illustrating the display device, according to various embodiments.

As illustrated in FIG. 6, according to various embodiments, the display device 100 may include a first communication circuit 110, a second communication circuit 120, a display 130, an audio module 140, a memory 150, and a processor 160. According to an embodiment, some elements may be omitted or additional elements may be provided. In addition, according to an embodiment, some of the elements may be combined with each other so as to form one entity and the functions of the elements may be performed in the same manner as before the combination. The input/output relation illustrated in FIG. 6 is provided for the illustrative purpose, but the present invention is not limited thereto.

According to an embodiment, the first communication circuit 110 may receive broadcast content from the broadcast receiving device 200. For example, the first communication circuit 110 may communicate with the broadcast receiving device 200 through a manner such as HDMI, DVI, VGA, a display port, a WiHD, or Wigig. The broadcast content may include, for example, a content (e.g., a broadcast program) image or an advertisement image.

According to an embodiment, the second communication circuit 120 may communicate with an external server such as the advertisement server 500 or the ACR server 300 through the communication network. For example, the second communication circuit 120 may communicate with the external server through the communication network such as the xDSL network, the LAN, the FTTH network, the Wi-Fi network, the Wibro, the 3G network, or the 4G network.

The display 130 may include, for example, a liquid crystal (LCD), a light-emitting diode (LED) display, an organic LED (OLED) display, or an electronic paper display. The display 130 may display, for example, various contents (e.g., a text, an image, a video, an icon, and/or a symbol) for a user. According to an embodiment, the display 130 may output first content image or second content image.

According to an embodiment, the audio module 140 may output the audio of the content under the control of the processor 160. The audio module 140 may include at least one of an amplifier or a speaker. The amplifier may amplify the volume to an amplification factor corresponding to the output volume level. The speaker may output the amplified audio of the first content or the second content. The audio module 140 may not include the speaker. In this case, the audio module 140 may output the audio by using an external speaker.

The memory 150 may include a volatile memory (e.g., a RAM), a non-volatile memory (e.g., an ROM, a flash memory, or the like), or the combination thereof. The memory 150 may store instructions or data associated with at least one of other element(s) of the electronic device.

According to an embodiment, the memory 150 may store instructions for identifying the type of the broadcast receiving device 200. The memory 150 may store the instructions for detecting the volume image from the broadcast content and for recognizing the volume information from the detected volume image. For example, the memory 150 may store information of the volume image according to the type of the broadcast receiving device 200. The information on the volume image may include, for example, at least one of feature information (e.g., a feature value) of the volume image, display area information (e.g., an area location, or an area size), or volume level information. The information on the volume image may include information on a volume control ratio, for example, information on the ratio between one unit of volume of the broadcast receiving device 200 and one unit of volume of the display device 100. The memory 150 may store volume images (type-based volume image) according to the types of broadcast receiving devices 200. The memory 150 may store instructions for restoring the volume to a volume made before the outputting of the second content when the outputting of the second content is completed or stopped.

The processor 160 may include, for example, at least one of a central processing unit (CPU), a graphics processing unit (GPU), a micro-processor, an application processor, an application specific integrated circuits (ASIC), or a field programmable gate array (FPGA), or may have a plurality of cores. The processor 160 may perform various data processing and arithmetic operations associated with the control and/or the communication of at least one of other elements of the display device 100.

According to an embodiment, the processor 160 may receive the first content from the broadcast receiving device 200 and thus may output the first content through the display 130 and the audio module 140. For example, the first content may be broadcast content (e.g., broadcast program content, advertisement content, or the like) corresponding to a channel or content selected through the remote controller of the broadcast receiving device 200.

According to an embodiment, the processor 160 may receive alternative advertisement information, which corresponds to the channel of the broadcast content, from the ACR server 300. For example, the processor 160 may create image identification information of a broadcast content image and may transmit the created image identification information to the ACR server 300. The image identification information may be, for example, at least one of a water mark or a fingerprint of the broadcast content image. As the ACR server 300 identifies the channel corresponding to the image identification information and transmits the alternative advertisement information for the identified channel, the processor 160 may recognize the alternative advertisement information (e.g., the starting time of an advertisement or identification information of the advertisement). The processor 160 may periodically create image identification information for broadcast content and may recognize alternative advertisement information corresponding to the image identification information. The processor 160 may perform at least a portion of operations performed by the ACR server 300.

According to an embodiment, the processor 160 may identify the type of the broadcast receiving device 200. For example, the processor 160 may receive device identification information of the broadcast receiving device 200 from the broadcast receiving device 200 through the first communication circuit 110. The processor 160 may request, through the first communication circuit 110, the broadcast receiving device 200 to provide the device identification information in an initialization procedure and may receive the device identification information from the broadcast receiving device 200. For another example, the processor 160 may identify the type of the broadcast receiving device 200 by using a first content image. The processor 160 may detect a multi-area image from the first content image and may determine one of multiple volume images according to types of broadcast receiving devices, with which the detected multi-area image is matched, thereby identifying (or determining) the type of the broadcast receiving device 200. For another example, the processor 160 may identify the type of the broadcast receiving device 200 by using a specified classifier. The specified classifier may be designed to perform machine learning for UI images according to the types of broadcast receiving devices and thus to classify the types of the broadcast receiving devices.

According to an embodiment, the processor 160 may output second content received from the advertisement server 500 instead of first content received from the broadcast receiving device 200 at the starting time of an advertisement based on the alternative advertisement information. For example, the processor 160 may request the advertisement server 500 to provide the second content (e.g., an alternative advertisement) and receive the second content from the advertisement server 500, before the starting time of the advertisement based on the alternative advertisement information. The processor 160 may output the second content instead of the first content at the starting time of the advertisement.

According to an embodiment, the processor 160 may determine whether a first volume image according to the type of the broadcast receiving device 200 is contained in the first content, when outputting the second content. The processor 160 may read, from the memory 150, first volume image information corresponding to the type of the broadcast receiving device 200 and may determine whether the first volume image is contained in the first content by using first volume image information (e.g., first display area information, the first volume image, feature information of the first volume image, or the like). For example, the processor 160 may detect an image, which has a size based on first display area information, from the location of the first content image, which is based on the first display area information. The processor 160 may determine whether the detected image is matched with the first volume image and may determine the first volume image to be contained in the first content if the detected image is matched with the first volume image. The processor 160 may determine whether the detected image is matched with the first volume image, for example, through a histogram matching, pattern matching or feature comparison manner. The following description will be made regarding a case that the processor 160 determines whether the detected image is matched with the first volume image through the feature comparison manners.

According to an embodiment, the processor 160 may recognize volume information (e.g., a volume level) of the broadcast receiving device 200 from a volume image, if the volume image applied by the broadcast receiving device 200 is contained in the first content. For example, the processor 160 may extract a number representing the volume level from a text area of the volume image through a character recognition algorithm (e.g., an optical character reader (OCR) algorithm) and may recognize the volume level of the broadcast receiving device 200 based on the extracted number. For another example, the processor 160 may recognize, from the volume image, volume information based on a pixel value of a symbol area corresponding to each volume level unit. As described above with reference to FIG. 3, if the symbol area corresponding to each volume level unit has a rectangular shape, the processor 160 may recognize, as the volume information, the number of rectangular symbols, each of which represents less than threshold brightness in an average pixel value of pixels included in the area of the rectangular symbol.

According to an embodiment, the processor 160 may overlay the first volume image corresponding to the recognized volume information (e.g., a volume level) or an alternative volume image corresponding to the first volume image with the second content to display the overlaid result. For example, the processor 160 may overlay the volume image (e.g., FIGS. 3 and 4) of the broadcast receiving device 200, which represents the volume level corresponding to the recognized volume information, with the second content to display the overlaid result. For another example, the processor 160 may create a volume image (e.g., FIG. 5) of the display device 100 representing the recognized volume information, may overlay the volume image with the second content, and may display the overlaid image.

According to an embodiment, the processor 160 may determine whether to change a volume level based on the recognized volume information. For example, the processor 160 may compare volume information, which is previously recognized, with volume information which is currently recognized. If the currently recognized volume information is different from the previously recognized volume information, the processor 160 may determine the volume level to be changed. According to an embodiment, if the volume level is changed, the processor 160 may control (e.g., increase or decrease) a volume level of the audio module 140 corresponding to the changed volume level. For example, since the volume level is changed in one volume level unit, the processor 160 may increase the volume level of the audio module 140 by one volume level unit if the processor 160 determines the volume level to be increased. If the processor 160 determines the volume level to be decreased, the processor 160 may decrease the volume level of the audio module 140 by the one volume level unit. As described above, according to an embodiment, the processor 160 may control the volume level of the display device 100 to correspond to the volume of the broadcast receiving device 200 controlled by a user through the remote controller of the broadcast receiving device 200. In addition, according to an embodiment, in the case that the volume information is determined to be changed according to the result of the comparison in volume information between multiple image frames contained in the first content, the volume level of the display device 100 may be controlled to correspond to the changed volume.

According to an embodiment, the processor 160 may control a volume level of the audio module 140 to correspond to the difference in volume level between the broadcast receiving device 200 and the display device 100. For example, the processor 160 may recognize, from the memory 150, a volume control ratio representing a ratio of one volume level unit of the display device 100 to one volume level unit of the broadcast receiving device 200. If the processor 160 determines the volume level to be changed by one volume level unit, the processor 160 may control the volume level of the audio module 140 at the volume control ratio. The volume control ratio may be determined by an experiment of comparing the broadcast receiving device 200 with the display device 100 in a volume size (dB). For example, if an output volume change of the broadcast receiving device 200 by one volume level unit corresponds to an output volume change of the display device 100 by 10 volume level units, the volume control ratio of the broadcast receiving device 200 may be 10. In this case, the processor 160 may change (increase or decrease) the volume level of the audio module 140 by 10 volume levels if recognizing the volume level change of the broadcast receiving device from the first content.

According to an embodiment, the processor 160 may determine whether a mute image is contained in the first content. Since the mute image may be displayed on an area different from an area of a level image representing the volume level, the processor 160 may detect the mute image from display area information of the mute image, which is contained in the first volume image information. According to an embodiment, in the case that the mute image is contained in the first content, the processor 160 may overlay the mute image of the display device 100 or the mute image of the broadcast receiving device 200 with the second content to display the overlaid result on the display 130, instead of outputting an audio through the audio module 140.

According to an embodiment, the processor 160 may store, in the memory 150, volume information (previous volume information) of the audio module 140, which is made before controlling the volume level of the audio module 140 to correspond to the changed volume level. The processor 160 may recover the volume level of the audio module 140 based on the previous volume information stored in the memory 150, after the outputting of the second content is completed or terminated. Therefore, according to an embodiment, there may be overcome the problem that a user may feel repulsion against the changed volume as the volume, which is output after the termination of the alternative advertisement, is excessively increased or decreased, due to the change in the volume when the alternative advertisement is output.

According to an embodiment, the processor 160 may determine whether another UI image is contained in the first content in addition to the volume image, while outputting the second content. For example, the processor 160 may determine whether another UI image is contained in each image frame of the first content in addition to the volume image, through a convolutional neural networks (CNN) algorithm. For another example, the processor 160 may receive the source of the first content having no UI image from an external server, may compare the source of the first content with the first content, and thus may determine whether another UI image is contained in the first content in addition to the volume image. For another example, the processor 160 may receive feature information of the source of the first content from the external server, may compare the received feature information of the source of the first content with feature information of the first content, and thus may determine whether another UI is included in the first content. The external server may be the ACR server 300, the broadcast server 400, the advertisement server 500, or another server.

According to an embodiment, the processor 160 may stop the outputting of the second content and may output the first content if another UI image is contained in the first content instead of the volume image. Therefore, according to an embodiment, in the case that the broadcast receiving device 200 changes a channel or content depending on a user input, the processor 160 may stop outputting the second content.

According to an embodiment different from the above-described embodiments, the processor 160 may display a volume image or control a volume level similarly to the above-described manners even if outputting another broadcast content instead of an alternative advertisement received from the advertisement server 500 or another server.

Figure 7:
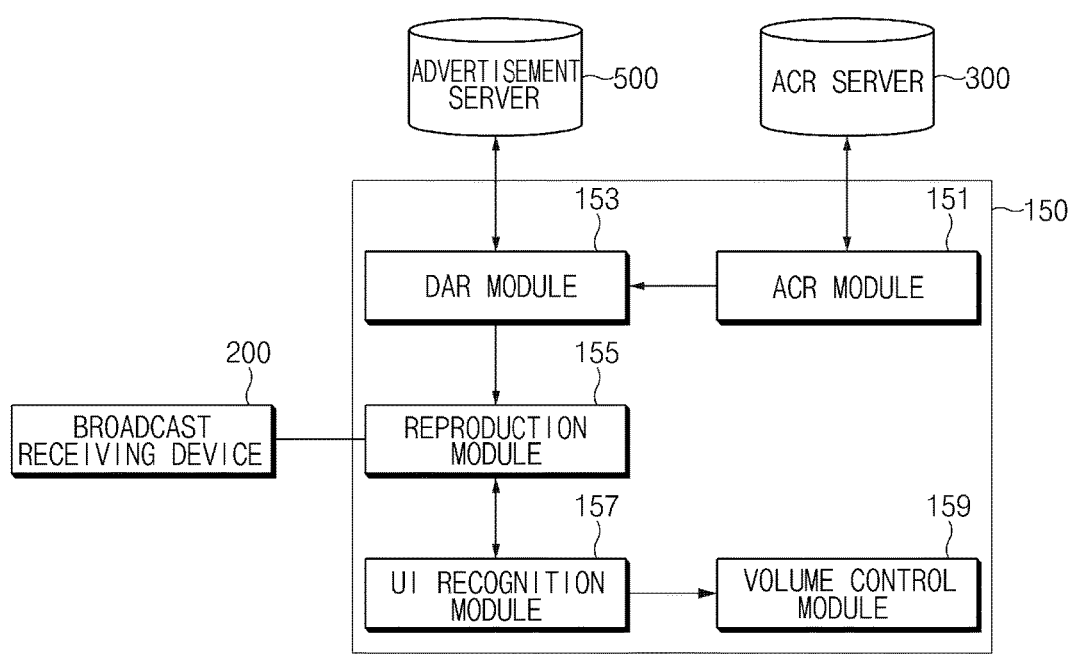
FIG. 7 is a block diagram illustrating a program module included in the display device, according to an embodiment.

FIG. 7 is a block diagram illustrating a program module included in the display device, according to an embodiment.

Referring to FIG. 7, the program module (e.g., an application) included in the display device 100 may include an ACR module 151, a DAR module 153, a reproduction module 155, a UI recognition module 157, and a volume control module 159. The program modules may be stored in the memory 150. The program modules are executed by the processor 160 to perform relevant operations.

The ACR module 151 may create image identification information based on an image displayed on the display 130. For example, the ACR module 151 may capture the image displayed on the display 130 and create the image identification information (fingerprint information or watermark information) by using the captured image. For example, the ACR module 151 may reduce the size of the captured image or may create the fingerprint information by extracting features representing the captured image. For another example, the ACR module 151 may extract an intrinsic watermark from the captured image to create watermark information. According to an embodiment, the ACR module 151 may transmit the image identification information to the ACR server 300. In this case, the ACR server 300 may determine whether an alternative advertisement is present for a channel corresponding to the image identification information and may transmit alternative advertisement information.

According to an embodiment, if receiving the alternative advertisement information from the ACR server 300, the DAR module 153 may transmit a request for the alternative advertisement to the advertisement server 500 before (or immediately before) the starting time of an advertisement based on the alternative advertisement information. The request for the alternative advertisement may include information necessary for the selecting of the alternative advertisement by the advertisement server 500. For example, the request for the alternative advertisement may include the alternative advertisement information and user profile information (e.g., a place of residence, a gender, an age, interests, or the like). According to an embodiment, the ACR module 151 may perform at least a portion of operations performed by the ACR server 300. In this case, the advertisement server 500 may transmit the alternative advertisement (or an alternative advertisement image) to the display device 100 in response to the request of the DAR module 153.

According to an embodiment, the UI recognition module 157 may identify the type of the broadcast receiving device 200. For example, the UI recognition module 157 may receive device identification information of the broadcast receiving device 200 from the broadcast receiving device 200. For another example, the processor 160 may identify the type of the broadcast receiving device 200 by using a first content image.

According to an embodiment, the UI recognition module 157 may use first volume image information corresponding to the identified type of the broadcast receiving device 200 to detect a volume image. The first volume image information may include, for example, display area information of the volume image, the volume image, or the feature information of the volume image. The UI recognition module 157 may determine whether the volume image is contained in the first content by using the first volume image information while outputting the second content instead of the first content. For example, the UI recognition module 157 may detect an image, which has a size based on the display area information, from the location of the first content based on display area information. The UI recognition module 157 may compare an image of the detected area with the volume image. If the image of the detected area is similar to the volume image by a threshold ratio or more, the UI recognition module 157 may determine the volume image to be included in the first content. The UI recognition module 157 may determine a volume change state, based on the volume image, if the volume image is contained in the first content.

According to an embodiment, the UI recognition module 157 may recognize volume information (e.g., a volume level) from the volume image of the first content. For example, the UI recognition module 157 may recognize at least one of a text or a symbol representing a volume level included in the volume image and thus may recognize the volume information of the broadcast receiving device 200.

According to an embodiment, if the volume information is recognized, the UI recognition module 157 may overlay the first volume image or an alternative volume image corresponding to the recognized volume information with the first content. For example, in the state that the volume level of the broadcast receiving device 200 is 3 and the volume level of the display device 100 is 12, the volume level of the broadcast receiving device 200 may be changed to 4. In this case, the UI recognition module 157 may overlay the volume image of the broadcast receiving device 200, which represents that the volume level of the broadcast receiving device 200 is changed from 3 to 4, with the second content. Alternatively, the UI recognition module 157 may output a volume image of the display device 100, which represents that the volume level of the display device 100 is changed from 12 to 13.

According to an embodiment, the UI recognition module 157 may determine whether another UI image is contained in the first content in addition to the volume image. The UI recognition module 157 may determine whether another UI image is contained in the first content, based on the result of the comparison between the image of the source of the first content having no UI image and the image of the first content received from the broadcast receiving device 200.

According to an embodiment, the volume control module 159 may determine whether a volume is changed, based on the recognized volume information. The volume control module 159 may control a volume level of the audio module 140 to correspond to the changed volume level if the volume is determined to be changed. According to an embodiment, the volume control module 159 may store volume level information of the audio module 140 before controlling the volume level of the audio module 140. Then, the volume control module 159 may recover the volume level of the audio module 140 to a volume level based on the stored volume level information, after the outputting of the second content is completed or terminated.

According to an embodiment, the reproduction module 155 may reproduce and output an alternative advertisement received from the advertisement server 500. According to an embodiment, the reproduction module 155 may display an alternative advertisement image on the display 130. For example, the reproduction module 155 may replace an advertisement image received from the broadcast receiving device 200 with the alternative advertisement image and may display the alternative advertisement image on the display 130. The reproduction module 155 may output, onto the display 130, the first content overlaid with the first volume image or the alternative advertisement image. According to an embodiment, the reproduction module 155 may output an alternative advertisement audio through the audio module 140 in synchronization with the alternative advertisement image. According to an embodiment, the reproduction module 155 may stop the outputting of the second content if another UI is determined to be contained in the first content in addition to the volume image.

Figure 8:
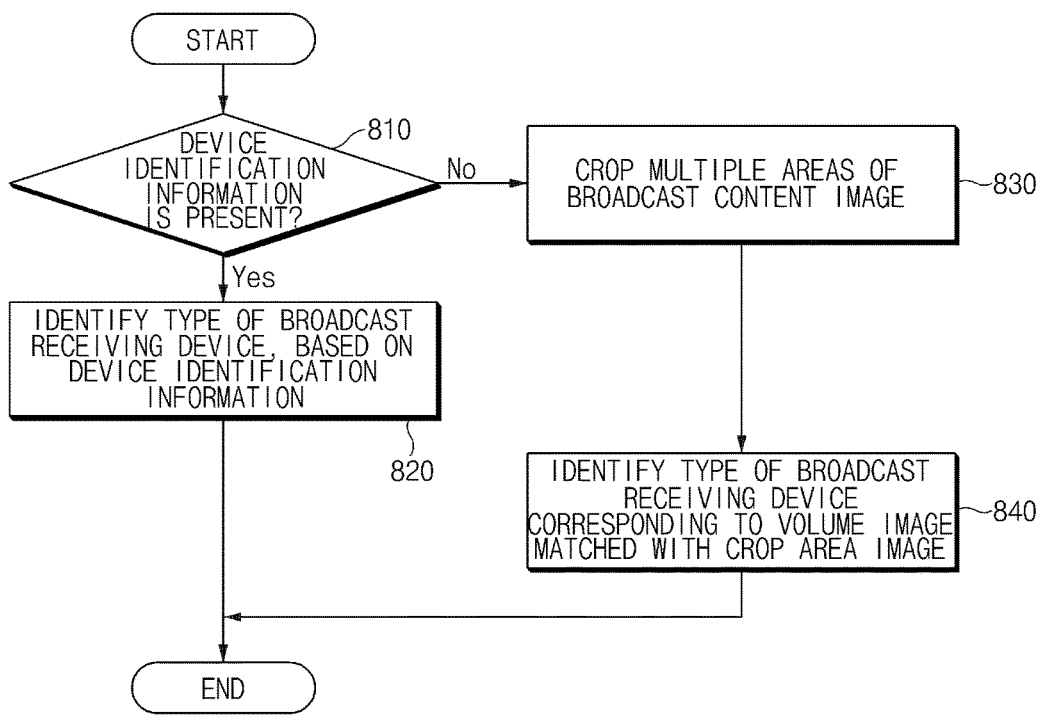
FIG. 8 is a flowchart illustrating a method for identifying the type of the broadcast receiving device, according to an embodiment.

FIG. 8 is a flowchart illustrating a method for identifying the type of the broadcast receiving device, according to an embodiment.

In operation 810, the processor 160 may determine whether device identification information recognized in an initialization procedure is present.

In operation 820, the processor 160 may identify the type (or volume image information) of the broadcast receiving device, based on the device identification information, if the device identification information recognized in an initialization procedure is present. In operation 820, the processor 160 may recognize the volume image information corresponding to the type of the broadcast receiving device and may use the volume image information when detecting the volume image thereafter.

In operation 830, the processor 160 may crop multiple areas of a broadcast content image if the device identification information is absent. The multiple areas may include, for example, a size area which is based on display area information and present at a location corresponding to the display area information according to the type of the broadcast receiving device. For example, if the multiple display areas of the volume image according to the type of the broadcast receiving device are areas A, B, C, D, and E, as illustrated in FIG. 2, the multiple display areas may correspond to the positions and the sizes of the areas A, B, C, D, and E.

In operation 840, the processor 160 may identify the type of the broadcast receiving device through the determination of whether each cropped area image is matched with one volume image of the broadcast receiving device. For example, the processor 160 may determine whether each cropped area image is matched with at least one of multiple volume images of the broadcast receiving device, through a histogram matching, template matching, or feature comparison manner. In the case that the processor 160 performs the feature comparison manner, if each cropped area image is matched with the feature information of one volume image of the broadcast receiving device at a threshold ratio or more, the processor 160 may determine the cropped area image to be matched with the volume image of the broadcast receiving device. The processor 160 may identify the type of the broadcast receiving device if the cropped area image is matched with the volume image of the broadcast receiving device. As described above, according to an embodiment, even if the type of the broadcast receiving device is not recognized, the type of the broadcast receiving device may be identified by using a UI image such as the volume image.

Figure 9:
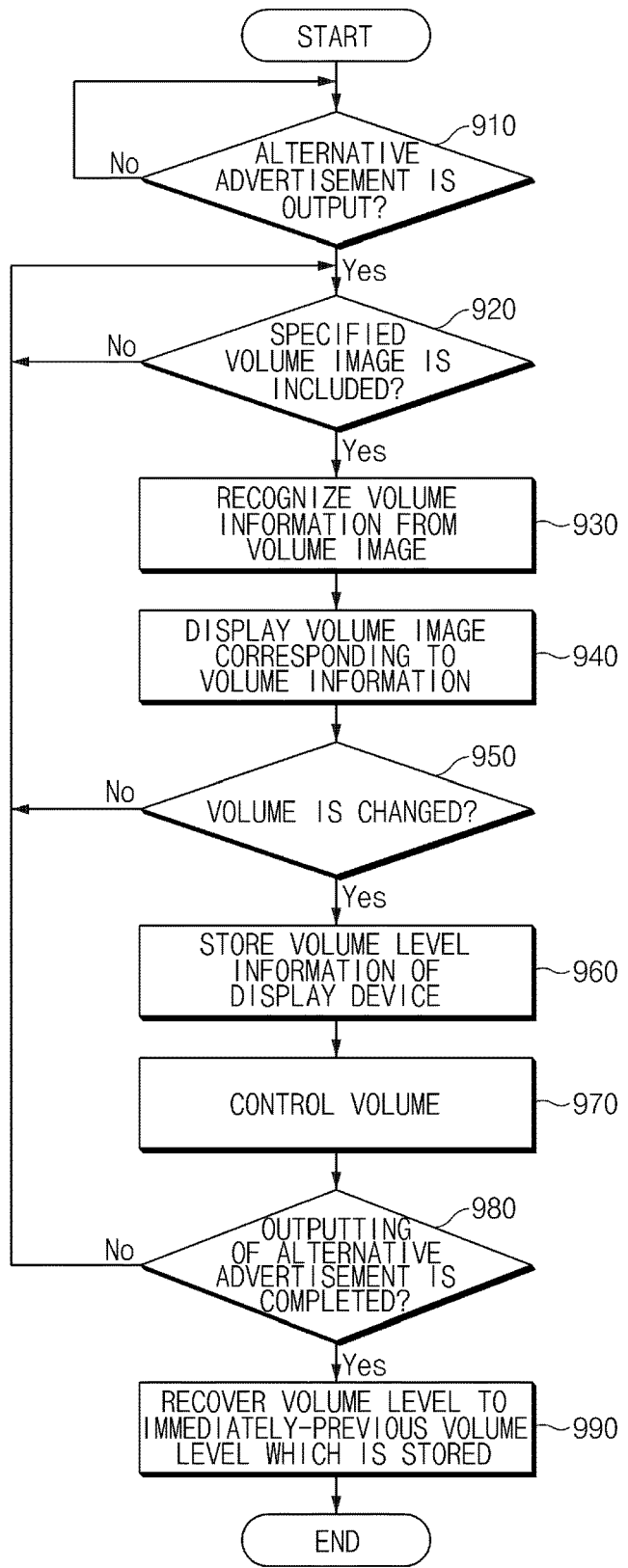
FIG. 9 is a flowchart illustrating a method for controlling a volume, according to an embodiment.

FIG. 9 is a flowchart illustrating a method for controlling a volume, according to an embodiment.

Referring to FIG. 9, in operation 910, the processor 160 may output alternative advertisement content instead of broadcast content at the starting time of an advertisement based on the alternative advertisement information.

In operation 920, the processor 160 may determine whether a specified volume image is contained in broadcast content when the alternative advertisement content is output. For example, the processor 160 may recognize display area information from volume image information according to the type of the broadcast receiving device. The processor 160 may crop an area of the first content corresponding to the display area information and may extract feature information from an image of the cropped area. The processor 160 may determine whether the extracted feature information is matched with the feature information of a volume image according to the type of the broadcast receiving device at the threshold ratio or more. If the extracted feature information is matched with the feature information of the specified volume image at the threshold ratio or more, the processor 160 may determine the specified volume image to be contained in the broadcast content.

In operation 930, if a volume image applied by the broadcast receiving device is contained in the broadcast content, the processor 160 may recognize the volume information (e.g., a volume level) from the volume image. For example, the processor 160 may recognize a volume level by recognizing a text representing the volume level from a text area of the volume image. For another example, the processor 160 may recognize, form the volume image, volume information based on a pixel value of a symbol area corresponding to each volume level. The processor 160 may recognize, as a volume level, the number of symbols, each of which represents less than threshold brightness in an average pixel value of pixels included in the area of the symbol.

In operation 940, the processor 160 may overlay the volume image corresponding to the volume level with alternative advertisement content to display the overlaid result. For example, the processor 160 may output a volume image of a display device, which represents a volume level. For another example, the processor 160 may output a volume image of the broadcast receiving device.

In operation 950, the processor 160 may determine whether a volume is changed (e.g., the volume is increased and decreased) by comparing previous volume information with present volume information.

In operation 960, the processor 160 may store volume level information (immediately-previous volume information) of the audio module 140 if determining the volume to be changed.

In operation 970, the processor 160 may control the volume level of the audio module 140 if determining the volume to be changed. For example, the processor 160 may control the volume level of the audio module 140 in synchronization with the display of a volume image corresponding to the changed volume level. The processor 160 may control the audio module 140 such that an output volume is increased, if the volume is determined to be increased. The processor 160 may control the audio module 140 such that the output volume is decreased, if the volume is determined to be decreased. For another example, the processor 160 may determine a volume control ratio corresponding to the ratio between the volume level of the broadcast receiving device and the volume level of the display device. When one volume level unit is increased or decreased, the volume level of the audio module 140 may be increased or decreased at the volume control ratio.

In operation 980, the processor 160 may monitor whether the outputting of the alternative advertisement is completed (or stopped). The processor 160 may repeatedly perform operations 910 to 970 until the outputting of the alternative advertisement is completed (or stopped).

In operation 990, the processor 160 may recover the volume of the display device to correspond to the immediately-previous volume information stored in the memory 150, if the outputting of the alternative advertisement is completed (or stopped).

In operation 920, the processor 160 may perform operation 990 if another UI image is determined to be contained in the first content in addition to the volume image. As described above, according to an embodiment, even when the alternative advertisement is output, the volume of the alternative advertisement may be controlled corresponding to a user input of instructing the control of the volume of the broadcast receiving device.

Figure 10:
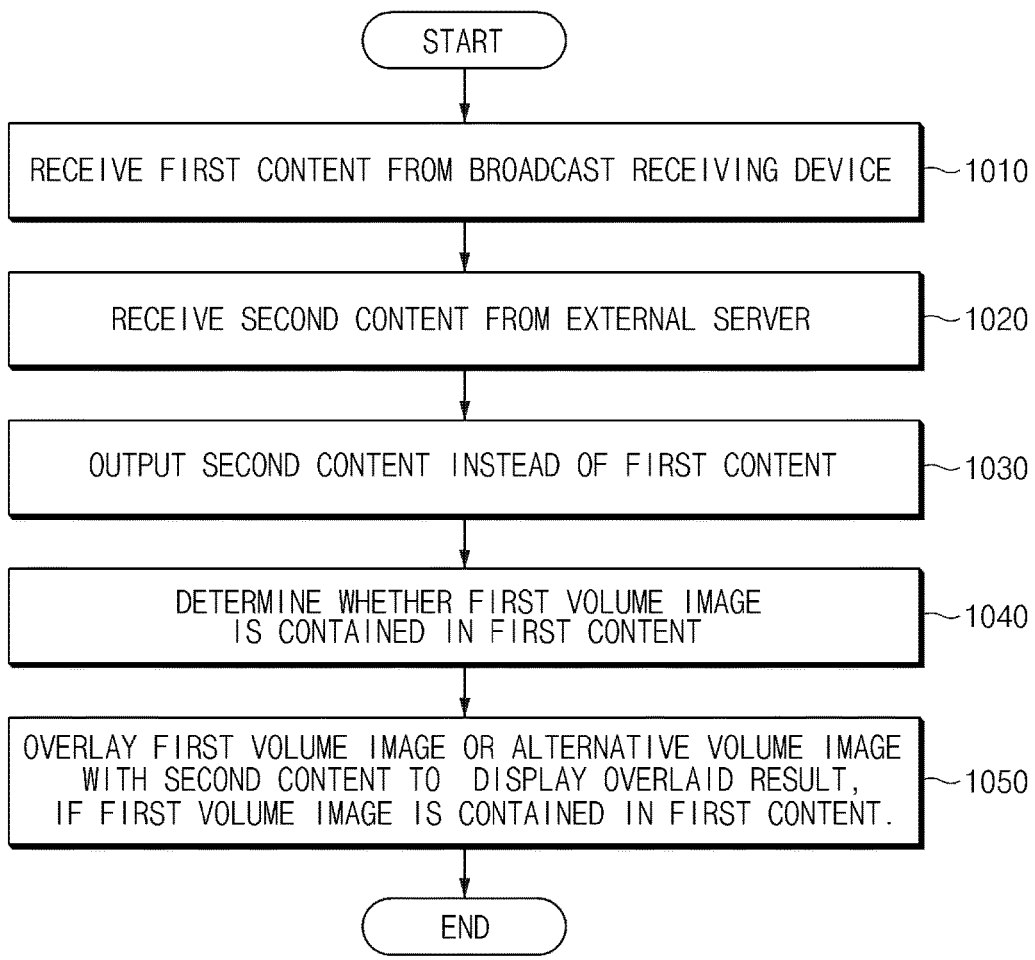
FIG. 10 is a flowchart illustrating a method for replacing an advertisement, according to an embodiment.

FIG. 10 is a flowchart illustrating a method for replacing an advertisement, according to an embodiment.

Referring to FIG. 10, in operation 1010, a display device (e.g., see reference numeral 100 of FIG. 1) may receive first content from a broadcast receiving device (see reference numeral 200 of FIG. 1).

In operation 1020, the display device 100 may receive second content from an external server (e.g., see reference numeral 500 of FIG. 1).

In operation 1030, the display device 100 may output the second content instead of the first content. For example, the display device 100 may request the advertisement server 500 to provide the second content (e.g., an alternative advertisement) and may receive the second content from the advertisement server 500, before the starting time of the advertisement based on the alternative advertisement information. The display device 100 may output the second content instead of the first content at the starting time of the advertisement.

In operation 1040, the display device 100 may determine whether a first volume image is contained in the first content while outputting the second content.

In operation 1050, the display device 100 may overlay a first volume image or an alternative volume image corresponding to the first volume image with the second content to display the overlaid result, if the first volume image is contained in the first content.

An embodiment of the present disclosure, a display device (e.g., see reference number 100 of the FIG. 6) includes a display (e.g., see reference number 130 of the FIG. 6); a first communication circuit (e.g., see reference number 110 of the FIG. 6) configured to receive first content from a broadcast receiving device; a second communication circuit (e.g., see reference number 120 of the FIG. 6) configured to receive second content from an external server; and a processor (e.g., see reference number 160 of the FIG. 6) electrically connected with the first communication circuit and the second communication circuit, wherein the processor is configured to determine whether a first volume image applied by the broadcast receiving device is contained in the first content, while outputting the second content; and overlay an alternative volume image corresponding to the first volume image with the second content to display an overlaid result on the display, if the first volume image is contained in the first content.

Wherein the first content is advertisement content of broadcast content received from a broadcast server by the broadcast receiving device, and wherein the second content is alternative advertisement content output instead of the advertisement content.

The display device further includes a memory (e.g., see reference number 150 of the FIG. 6) store the first volume image, wherein the first volume image is a volume image of the broadcast receiving device, which is read from the memory, and wherein the alternative volume image is a volume image of the display device displayed when a volume of the display device is controlled.

The display device further includes a memory configured to store at least one of a second volume image corresponding to a type of the broadcast receiving device or feature information of the second volume image, wherein the processor is configured to identify the type of the broadcast receiving device; recognize the first volume image from a specified area of the first content; acquire, from the memory, the at least one of the second volume image corresponding to the identified type of the broadcast receiving device or the feature information of the second volume image; determine whether the second volume image is matched with the first volume image, by using the first volume image and the at least one of the second volume image or the feature information of the second volume image; and determine the first volume image to be contained in the first content, if the second volume image is matched with the first volume image.

The processor is configured to identify the type of the broadcast receiving device as the processor receives identification information of the broadcast receiving device from the broadcast receiving device through the first communication circuit.

Wherein the memory stores at least one of multiple volume images according to types of a plurality of broadcast receiving devices including the broadcast receiving device or feature information of the multiple volume images, and wherein the processor is configured to identify the type of the broadcast receiving device depending on determination of whether the first volume image is matched with one of the multiple volume images, based on the at least one of the multiple volume images or the feature information of the multiple volume images.

Wherein the memory further stores display area information of the second volume image, wherein the processor is configured to detect an image of an area based on the display area information from the first content; and determine whether the detected image is matched with the second volume image, based on the at least one of the second volume image or the feature information of the second volume image.

Wherein the processor is configured to determine whether another user interface (UI) image is contained in the first content in addition to the first volume image; and stop the outputting of the second content, if the another UI image is contained in the first content.

Wherein the processor is configured to receive a source of the first content, to which an UI image including the first volume image is not applied, by using the broadcast receiving device through the second communication circuit; and determine whether the another UI image is contained in the first content by comparing the source of the first content with the first content.

Wherein the processor is configured to recognize a volume level from the first volume image, based on a text or at least one symbol representing the volume level contained in the first volume image; and overlay the first volume image representing the recognized volume level or the alternative volume image with an image of the second content.

The display device further includes an audio module (e.g., see reference number 140 of the FIG. 6) configured to output an audio of the first content or an audio of the second content, wherein the processor is configured to determine whether a volume level of the broadcast receiving device is changed, by comparing the recognized volume level with a previous volume level of the broadcast receiving device; and control a volume level of the audio module to correspond to the volume level of the broadcast receiving device if the volume level of the broadcast receiving device is changed.

The display device further includes a memory, wherein the processor is configured to store the volume level of the audio module in the memory, if the volume level of the broadcast receiving device is changed; and recover the volume level of the audio module to the volume level stored in the memory, if the outputting of the second content is completed or stopped.

The display device further includes an audio module configured to output an audio of the first content or an audio of the second content, wherein the processor is configured to prevent the audio of the second content from being output through the audio module, if the first volume image is a mute image.

An embodiment of the present disclosure, a method for replacing an advertisement of a display device, the method includes receiving first content from a broadcast receiving device; receiving second content from an external server; outputting the second content instead of the first content; determining whether a first volume image is contained in the first content, while outputting the second content; and overlaying the first volume image or an alternative volume image corresponding to the first volume image with the second content to display an overlaid result, if the first volume image is contained in the first content.

The method further includes an audio module configured to output an audio of the first content or an audio of the identifying a type of the broadcast receiving device as identification information of the broadcast receiving device is received from the broadcast receiving device; or identifying the type of the broadcast receiving device based on a comparison result between multiple volume images according to types of a plurality of broadcast receiving devices and an image of the first content.

The method further includes determining whether another user interface (UI) image is contained in the first content in addition to the first volume image when the second content is output; and stopping the outputting of the second content, if the another UI image is contained in the first content.

The method further includes wherein the displaying of the overlaid result includes recognizing a volume level of the broadcast receiving device, by recognizing a text or at least one symbol representing the volume level contained in the first volume image; and overlaying the first volume image representing the recognized volume level or the alternative volume image with the second content.

The method further includes recognizing a volume level of the broadcast receiving device, by recognizing a text or at least one symbol representing the volume level contained in the first volume image; determining whether a volume level of the broadcast receiving device is changed by comparing the recognized volume level with a previous volume level of the broadcast receiving device; and controlling a volume level of the display device to correspond to the volume level of the broadcast receiving device, which is changed, if the volume level of the broadcast receiving device is changed.

The method further includes storing the volume level of the display device if the volume level of the broadcast receiving device is changed; determining whether the outputting of the second content is completed or stopped; and restoring the volume level of the display device to the stored volume level if the outputting of the second content is completed or stopped.

An embodiment of the present disclosure, a computer-readable recording medium having a program recorded thereon which performs a method includes outputting second content from an external server instead of first content from a broadcast receiving device; determining whether a first volume image is contained in the first content, while outputting the second content; and overlaying a first volume image or an alternative image corresponding to the first volume image with the second content to display an overlaid result, if the first volume image is contained in the first content.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 160, may cause the one or more processors to perform a function corresponding to the instruction. The computer-readable storage media, for example, may be the memory 150.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display device comprising:
 a display;
 a first communicator configured to receive first content from a broadcast receiving device;
 a second communicator configured to receive second content from an external server; and
 a processor configured to:
  identify a type of the broadcast receiving device, as identification information of the broadcast receiving device is received, from the broadcast receiving device through the first communicator;
  determine whether a first volume image, corresponding to the identified type of the broadcast receiving device, is contained in the received first content while outputting the received second content;
  when the processor determines that the first volume image is contained in the received first content, overlay the first volume image or an alternative volume image corresponding to the first volume image, with the received second content; and
display an overlaid result.

2. The display device of claim 1, wherein the received first content is advertisement content of broadcast content which is received from a broadcast server by the broadcast receiving device, and
wherein the received second content is alternative advertisement content which is output instead of the advertisement content.

3. The display device of claim 1, further comprising:
a memory to store the first volume image,
wherein the stored first volume image is a volume image of the broadcast receiving device which is read from the memory, and
wherein the alternative volume image is a volume image of the display device displayed when a volume of the display device is controlled.

4. The display device of claim 1, further comprising:
a memory configured to store at least one of a second volume image corresponding to the type of the broadcast receiving device and feature information of the second volume image,
wherein the processor is configured to:
recognize the first volume image from a specified area of the received first content;
acquire, from the memory, the at least one of the second volume image corresponding to the identified type of the broadcast receiving device and the feature information of the second volume image;
determine whether the second volume image is matched with the first volume image, by using the first volume image and the at least one of the second volume image and the feature information of the second volume image; and
determine the first volume image to be contained in the received first content when the processor determines that the second volume image is matched with the first volume image.

5. The display device of claim 4, wherein the memory stores at least one of multiple volume images according to types of a plurality of broadcast receiving devices including the broadcast receiving device and feature information of the multiple volume images, and
wherein the processor is configured to
identify the type of the broadcast receiving device depending on a determination of whether the first volume image is matched with one of the multiple volume images, based on the at least one of the multiple volume images and the feature information of the multiple volume images.

6. The display device of claim 4, wherein the memory further stores display area information of the second volume image,
wherein the processor is configured to:
detect an image of an area based on the display area information from the received first content; and
determine whether the detected image is matched with the second volume image, based on the at least one of the second volume image or the feature information of the second volume image.

7. The display device of claim 1, wherein the processor is configured to:
determine whether another user interface (UI) image is contained in the received first content in addition to the first volume image; and
stop the outputting of the received second content, if the another UI image is contained in the received first content.

8. The display device of claim 7, wherein the processor is configured to:
receive a source of the received first content, to which an UI image including the first volume image is not applied, by using the broadcast receiving device through the second communication circuit; and
determine whether the another UI image is contained in the received first content by comparing the source of the received first content with the received first content.

9. The display device of claim 1, wherein the processor is configured to:
recognize a volume level information from the first volume image, based on a text or at least one symbol representing the volume level contained in the first volume image; and
overlay the first volume image representing the recognized volume level information or the alternative volume image with an image of the received second content.

10. The display device of claim 9, further comprising:
an audio module configured to output an audio of the received first content or an audio of the received second content,
wherein the processor is configured to:
determine whether a volume level information of the broadcast receiving device is changed, by comparing the recognized volume level with a previous volume level which is recognized from previous first volume image; and
control a volume level of the audio module to correspond to the volume level information when the volume level information is changed.

11. The display device of claim 10, further comprising:
a memory,
wherein the processor is configured to:
store the volume level information of the audio module in the memory, when the volume level information is changed; and
recover the volume level of the audio module to the volume level information stored in the memory when the outputting of the received second content is completed or stopped.

12. The display device of claim 1, further comprising:
an audio module configured to output an audio of the received first content or an audio of the received second content,
wherein the processor is configured to
prevent the audio of the received second content from being output through the audio module when the first volume image is a mute image.

13. A method for replacing an advertisement displayed in a display device, the method comprising:
identifying a type of a broadcast receiving device, as identification information of the broadcast receiving device is received, from the broadcast receiving device;
receiving first content from the broadcast receiving device;
receiving second content from an external server;
outputting the received second content instead of the received first content;
determining whether a first volume image, corresponding to the identified type of the broadcast receiving device, is contained in the received first content while outputting the received second content;

in response to determining that the first volume image is contained in the received first content, overlaying the first volume image or an alternative volume image corresponding to the first volume image, with the received second content; and displaying an overlaid result from the overlaying.

14. The method of claim 13, wherein the identifying further comprising identifying the type of the broadcast receiving device based on a comparison result between multiple volume images according to types of a plurality of broadcast receiving devices and an image of the received first content.

15. The method of claim 13, further comprising:

determining whether another user interface (UI) image is contained in the received first content in addition to the first volume image when the received second content is output; and stopping the outputting of the received second content, when the another UI image is determined to be contained in the received first content.

16. The method of claim 13, wherein the displaying of the overlaid result includes:

recognizing a volume level information of the broadcast receiving device, by recognizing a text or at least one symbol which represents the volume level contained in the first volume image; and overlaying the first volume image which represents the recognized volume level information or the alternative volume image with the received second content.

17. The method of claim 13, further comprising:

recognizing a volume level information of the broadcast receiving device, by recognizing a text or at least one symbol which represents the volume level contained in the first volume image;

determining whether a volume level information of the broadcast receiving device is changed by comparing the recognized volume level information with a previous volume level information which is recognized from previous first volume image; and controlling a volume level of the display device to correspond to the volume level information of the broadcast receiving device, which is changed, when the volume level information is changed.

18. The method of claim 17, further comprising:

storing the volume level information of the display device when the volume level information of the broadcast receiving device is changed;

determining whether the outputting of the received second content is completed or stopped; and restoring the volume level of the display device to the stored volume level information when the outputting of the received second content is completed or stopped.

19. A non-transitory computer-readable recording medium having a program recorded thereon which performs a method including:

identifying a type of a broadcast receiving device, as identification information of the broadcast receiving device is received, from the broadcast receiving device;

outputting second content from an external server instead of first content from a broadcast receiving device;

determining whether a first volume image, corresponding to the identified type of the broadcast receiving device, is contained in the first content while outputting the second content;

in response to determining that the first volume image is contained in the received first content, overlaying a first volume image or an alternative image corresponding to the first volume image with the second content;

and displaying an overlaid result from the overlaying.

\* \* \* \* \*